(12) United States Patent
Schmezer et al.

(10) Patent No.: US 12,095,321 B2
(45) Date of Patent: Sep. 17, 2024

(54) ELECTRIC MOTOR AND METHOD FOR EVALUATING THE VIBRATION STATE OF AN ELECTRIC MOTOR

(71) Applicant: ZIEHL-ABEGG SE, Künzelsau (DE)

(72) Inventors: Joachim Schmezer, Niedernhall (DE); Dominik Schuebel, Künzelsau (DE)

(73) Assignee: ZIEHL-ABEGG SE, Künzelsau (DE)

( * ) Notice: Subject to any disclaimer, the term of this patent is extended or adjusted under 35 U.S.C. 154(b) by 778 days.

(21) Appl. No.: 17/260,840

(22) PCT Filed: Jun. 3, 2019

(86) PCT No.: PCT/DE2019/200057
§ 371 (c)(1),
(2) Date: Jan. 15, 2021

(87) PCT Pub. No.: WO2020/015796
PCT Pub. Date: Jan. 23, 2020

(65) Prior Publication Data
US 2021/0296977 A1    Sep. 23, 2021

(30) Foreign Application Priority Data

Jul. 17, 2018 (DE) .......................... 102018211838.8

(51) Int. Cl.
*H02K 29/14*     (2006.01)
*H02K 5/22*      (2006.01)
(Continued)

(52) U.S. Cl.
CPC .............. *H02K 29/14* (2013.01); *H02K 5/225* (2013.01); *H02K 7/14* (2013.01); *H02K 11/33* (2016.01); *H02K 2211/03* (2013.01)

(58) Field of Classification Search
CPC .......... H02K 29/14; H02K 5/225; H02K 7/14; H02K 11/33; H02K 2211/03
See application file for complete search history.

(56) References Cited

U.S. PATENT DOCUMENTS 5,659,210 A * 8/1997 Yeany .................. G09B 23/188
                                                              310/1
9,704,520 B1* 7/2017 Nakamura ........... G11B 5/4873
(Continued)

FOREIGN PATENT DOCUMENTS

AU       2017100471       6/2017
DE     102009044509       5/2011
(Continued)

OTHER PUBLICATIONS

WO-0219500-A1_translate (Year: 2002).*
DE-102012201676-A1_translate (Year: 2013).*
JP-07324974-A_translate (Year: 1995).*
JP-2011027585-A_translate (Year: 2011).*

*Primary Examiner* — Tulsidas C Patel
*Assistant Examiner* — Mohammed Ahmed Qureshi
(74) *Attorney, Agent, or Firm* — FisherBroyles, LLP; Jason P. Mueller (57) ABSTRACT

Disclosed is an electric motor with a stator, a rotor rotatably mounted relative to the stator and motor electronics. The motor electrics is arranged in an electronics housing and mounted on a circuit board. On the circuit board there is arranged at least one vibration sensor configured for measuring an acceleration and/or speed of vibrations of the electric motor in at least one direction. In addition, said circuit board is vibrationally coupled with other components of the electric motor using at least one coupling element, so that at least parts of the vibrations of the electric motor are transmitted to the vibration sensor. Furthermore, a fan is disclosed, including an electric motor and an impeller. A method for evaluating a vibration state of an electric motor is disclosed, wherein said electric motor can be formed by an electric motor as also disclosed herein.

17 Claims, 10 Drawing Sheets

(51) Int. Cl.
*H02K 7/14* (2006.01)
*H02K 11/33* (2016.01)

(56) References Cited

U.S. PATENT DOCUMENTS

| | | | | |
|---|---|---|---|---|
| 2006/0110086 A1* | 5/2006 | Morita | ............... | F16C 33/723 |
| | | | | 384/448 |
| 2012/0134076 A1* | 5/2012 | Gausepohl | ........... | H01R 43/005 |
| | | | | 29/829 |
| 2012/0181965 A1 | 7/2012 | Chamberlin | | |
| 2016/0020677 A1* | 1/2016 | Sauer | ................ | G01R 31/343 |
| | | | | 310/68 B |
| 2017/0321707 A1* | 11/2017 | Takeshita | .............. | F04D 29/325 |
| 2018/0370563 A1* | 12/2018 | Schaenzel | ............ | B62D 5/0484 |

FOREIGN PATENT DOCUMENTS

| | | | | |
|---|---|---|---|---|
| DE | 102012100244 | | 7/2012 | |
| DE | 102012201676 A1 * | | 8/2013 | ............ B60K 25/02 |
| DE | 102013102648 | | 9/2014 | |
| EP | 2972431 | | 1/2016 | |
| JP | 07324974 A * | | 12/1995 | |
| JP | 3214233 | | 10/2001 | |
| JP | 2010259173 | | 11/2010 | |
| JP | 2011027585 A * | | 2/2011 | |
| RU | 86006 U1 | | 8/2009 | |
| RU | 2626231 C1 | | 7/2017 | |
| WO | WO-0219500 A1 * | | 3/2002 | ........... H02K 11/026 |

\* cited by examiner

ELECTRIC MOTOR AND METHOD FOR EVALUATING THE VIBRATION STATE OF AN ELECTRIC MOTOR

This application is a national stage entry under 35 U.S.C. 371 of PCT Patent Application No. PCT/DE2019/200057, filed Jun. 3, 2019, which claims priority to German Patent Application No. 10 2018 211 838.8, filed Jul. 17, 2018, the entire contents of each of which are incorporated herein by reference.

The disclosure relates to an electric motor having a stator, rotor rotatably mounted relative to the stator and a motor electronics, wherein said motor electronics is arranged in an electronics housing and mounted on a circuit board. The disclosure also relates to a fan with such an electric motor.

The disclosure further relates to a method for evaluating a vibration state of an electric motor.

Electric motors are exposed to various types of vibrations during their operation. These vibrations can be caused by the electric motor itself, by the driven load or by the environment in which the electric motor is installed. For example, when the electric motor is a component of a fan, an imbalance of the impeller or stalls can generate vibrations. In addition, a non-uniform drive torque, which can arise, for example, from a pulsating DC link voltage, can further intensify the vibrations. If the fan is installed in an industrial environment, vibrations from the environment can also be transmitted to the electric motor. If the fan is also operated at a rotational speed at which a resonance of the fan occurs, the vibrations can be even more pronounced.

Prior to delivery to the customer or prior to the installation in a housing, motors or fans are usually dynamically balanced by reducing non-symmetrical weight distributions or other vibration generating circumstances. However, damages can occur already during installation in a housing, transport to the customer, installation in a customer application or at the end customer, which damages can affect the balance quality. When a fan is operated in environments with adherent soiling, such as in agriculture or in severe corrosive environmental conditions, the balance quality is also affected over the service life of the fan, as, for example, deposits or corrosions can have an effect on the weight distribution.

Imbalances lead to increased vibrations, which in turn place a heavy load on the components of the electric motor. For example, the bearings are subjected to considerably more stress than would be the case with a less vibrating system. A high level of vibration can cause the service life of the electric motor and/or its components to be significantly reduced. It is therefore worthwhile to measure the vibrations to which the electric motor is exposed.

EP 2 972 431 B1 discloses an electric motor having a function monitoring of the motor bearings. For this purpose, a vibration sensor is attached on the stator flange on its side facing away from the rotor using a metallic body sound element. This vibration sensor measures vibrations from the electric motor. In this way, problems with the bearing of the electric motor can be identified. By attaching the vibration sensor to the stator flange, the vibrations of the electric motor can be measured effectively and reliably. However, attaching the vibration sensor on the stator flange is complex and therefore costly. Furthermore, strong shocks of the electric motor can damage the vibration sensor.

Therefore, it is the object of the present disclosure to configure and develop an electric motor, a fan and a method of the type mentioned above in such a way that a reliable measurement of vibrations of the electric motor and/or a reliable determination of a vibration state of the electrical motor together with low cost is possible.

According to various embodiments, an the electric motor may include at least one vibration sensor arranged on the circuit board which vibration sensor is configured to measure an acceleration and/or speed of vibrations of the electric motor in at least one direction, and that the circuit board is vibrationally coupled to other components of the electric motor using at least one coupling element, so that at least parts of the vibrations of the electric motor are transmitted to the vibration sensor.

In some embodiments, a fan may include an electric motor and an impeller, the impeller being connected to the rotor of the electric motor.

In some embodiments, a method may include:
generating a measurement signal using at least one vibration sensor, wherein said at least one vibration sensor is configured for measuring an acceleration and/or a speed of vibrations of the electric motors in at least one direction,
determining an amplitude and/or phase and/or frequency of the measurement signal to determine at least one parameter of the vibration of the electric motor,
comparing said determined at least one parameter with a corresponding reference parameter, and
determining a vibration state of the electric motor based on the result of the comparison of the determined at least one parameter with the corresponding reference parameter.

According to some embodiments, it is has first been recognized that attaching a vibration sensor directly on a stator bushing of the electric motor can be dispensed with. Rather, information about the vibration behavior of an electric motor can also be obtained by arranging a vibration sensor on a circuit board, which is arranged in an electronics housing of the electric motor, and said vibration sensor measures the acceleration and/or the speed of vibrations in at least one direction. It has been recognized that vibrations of the electric motor can be transmitted sufficiently well to the circuit board so that the vibrations of the electric motor can be measured by a vibration sensor arranged on the circuit board. Individual frequencies or ranges of the spectrum of the vibrations, however, can be dampened or filtered out by the circuit board or its fastener. However, vibrations reaching the vibration sensor are sufficiently informative to be able to gain information about the vibration behavior of the electric motor. Therefore, the vibrations of the electric motor are not measured directly, rather the vibrations that are transmitted to the circuit board of the motor electronics. Since the motor electronics may be integrated in a process step in the electric motor, there is no additional process step during assembly of the electric motor when the vibration sensor is arranged on the circuit board of the motor electronics, so that the production cost is practically not affected by the vibration sensor.

So that there is a defined coupling behavior between the vibration sensor and other components of the electric motor, at least one coupling element is used to vibrationally couple the circuit board and/or the vibration sensor with other components of the electric motor. If the relationship between the vibrations of the electric motor and measured values collected by the vibration sensor may be derived, for example, from calibration measurements, conclusions can be drawn from on the vibration behavior of the electric motor the measured values.

The "other components of the electric motor", between which the at least one coupling element is intended to improve the transmission of vibrations, can be formed by a wide variety of components of the electric motor. Merely by way of example, but not limiting, the "other components of the electric motor" may be formed by a stator bushing, a motor housing, a bearing tube, a stator coil package, a fixture of the electric motor or the electronics housing.

The motor electronics, on the circuit board of which the vibration sensor is arranged, can fulfill a wide variety of functions. In the simplest case, the motor electronics can be formed by a circuit board with connecting conductors and soldering pads. Such circuit boards can be used, for example, to connect individual coils of the stator to one another. In some embodiments, however, the motor electronics also consists of further electrical and/or electronic components. The motor electronics in this case may include simple sensors providing sensor signals, for example for the rotational speed, to an external control device of the electric motor. The motor electronics can also take on control tasks and/or include a power section. According to some embodiments, the motor electronics provide windings of the stator and/or windings of the rotor with a supply signal. For this purpose, the motor electronics can have a supply voltage input, into which a supply voltage, for example, a DC voltage or a three-phase system, is entered. From the input supply voltage, the motor electronics then generates a system of supply signals that cause the rotor of the electric motor to perform a rotational movement.

In principle, the circuit board can also be constructed from a wide variety of materials. However, the circuit board is may be made from a rigid composite material on which conductor tracks are applied. Frequently, such circuit boards are made from a fiber reinforced plastic. The circuit board can have conductor tracks on several levels, for example on an top side and a bottom side and optionally additionally in one or more intermediate layers which is/are inserted between the top side and the bottom side. Corresponding circuit boards are well known from practice.

The vibration sensor can be formed in a wide variety of ways. Importantly, the vibration sensor is capable of providing acceleration and/or speed values for the measured vibration. Here, the vibration sensor can be formed by a MEMS (Micro Electro-Mechanical System) acceleration sensor, a piezoelectric acceleration sensor, a microphone (for example a MEMS microphone) or strain gauges. Suitable sensors for this purpose are well known from practice.

The vibration sensor is—as already mentioned—configured for measuring an acceleration and/or a speed of vibrations of the electric motor in at least one direction. There can be configurations in which the measurement is sufficient in only one direction. This may be the case, for example, when the electric motor tends to exhibit strong vibrations in said one direction, while other directions develop comparatively little tendency to vibrate. In some embodiments, the vibrations are, however, measured in several directions, e.g., in three directions, wherein the individual directions are not parallel to each other. The choice of directions in which vibrations are measured, may depend on the vibration mode, in which the electric motor usually vibrates. In an example configuration, the directions in which vibrations are measured, however, are formed to be perpendicular to each other, said three directions, for example, forming a classic Cartesian coordinate system. In this case, for example, a first direction may be parallel to the axis of the electric motor while one of the other directions is arranged in parallel to a reference plane of the electric motor.

When measuring vibrations in several directions, a single vibration sensor can be used, which is configured to measure in the respective desired directions. Thus, for example, vibration sensors are known from practice that are capable of measuring vibrations that are arranged in three mutually perpendicular directions. However, the vibration sensor can be formed also by a system of vibration sensors, each of the vibration sensors of the system covering one of the directions. This configuration is useful when the directions in which the vibrations are to be measured are not perpendicular to one another. Using such a system of vibration sensors, any number of axis constellations can be produced. If the individual vibration sensors of the system are arranged close to each other on the circuit board, the measurements of the system from vibration sensors only negligibly differ from a measurement of an individual vibration sensor.

In principle, the electronics housing can be arranged at various locations of the electric motor. It is only important that the electronics housing is vibrationally coupled with other components of the electric motor. This can be achieved in a simple manner in that the electronic housing is integrated in the electric motor or is attached to the exterior of a motor housing. In the second case mentioned, for example the electronics housing can be implemented as an independent, closed electronics pot that is flanged to the motor housing. The electronics housing may be arranged on a stator bushing of the electric motor, i.e., the motor electronics is arranged near the axis of the shaft, in which case the circuit board then usually being arranged perpendicular to the shaft axis.

Furthermore, it is fundamentally irrelevant whether the motor electronics within the electronics housing is accessible after the completion of the electric motor or not. Since the motor electronics in current electric motors is often molded with a casting compound, the motor electronics is usually not directly accessible anyway. This can even go so far that the electronics housing is fully encapsulated by an overmold so that there is actually no access to the electronics housing and the motor electronics without destruction. As long as there is access to a vibrational coupling between the vibration sensor and other components of the electric motor, even such an electronics housing may be suitable.

In principle, the electronics housing can have a wide variety of shapes. However, the electronics housing may include a bottom and side walls. In an electronics housing configured in this way, the circuit board is arranged substantially in parallel to the bottom of the electronics housing. In a simplest configuration, such an electronics housing is cup-shaped with a circular base. However, the base can also have other shapes. Regular shapes such as, for example, square, rectangle, hexagon or octagon, can also be used as irregular forms. Likewise, the side walls do not necessarily have to be perpendicular to the bottom. Such an electronics housing is usually closed by a cover which closes off an open area of the electronics housing. In this case, the cover may be arranged, for example, in parallel to the bottom.

In a configuration, the vibration sensor is arranged on a side of the circuit board facing away from the bottom of the electronics housing—top side of the circuit board. Such a configuration has the advantage, in examples of strong vibration stress of the electric motor, that a relatively large gap between the electronics housing and the vibration sensor forms.

In another configuration, the vibration sensor is arranged on a side of the circuit board facing the bottom of the electronics housing—bottom side of the circuit board. Such a configuration offers the advantage that vibrations with a corresponding coupling between the bottom and the vibration sensor, are conducted more easily and more effectively to the vibration sensor, and more precise measurements can be possible in this way.

In principle it is also conceivable that, in a system of vibration sensors, a first part of the vibration sensors at the top and a second part of the vibration sensors are arranged on the bottom of the circuit board.

Regardless of whether the at least one vibration sensor is arranged on the top and/or bottom of the circuit board, the bottom of the electronics housing may include a protrusion in the area of the at least one sensor, so that the distance between the at least one vibration sensor and the electronics housing is reduced. Here, the protrusion may be formed planar at its top side. "In the area of the vibration sensor" means in this case that, when looking at the top of the circuit board, there is significant overlap between the vibration sensor or the vibration sensors and the protrusion at the bottom of the electronics housing. The protrusion does not necessarily have to extend over the entire surface that is spanned by the at least one vibration sensor. To avoid distortions it is useful, however, that the protrusion is at least as large as the vibration sensor, or—in case of several vibration sensors—the area spanned by the vibration sensors.

For the arrangement of the vibration sensor on the circuit board it may be advantageous, if waveforms occurring at various applications are known. Thus, the vibration sensor can be positioned and its measurement directions can be aligned so that the measurement signals generated provide a clear and differentiable picture of the vibrations and the vibration modes.

In principle, the coupling element can be formed from a wide variety of materials. It is important that vibrations are transmitted by the coupling element better than by air and in this way, an improved coupling between the vibration sensor and other components of the electric motor can be established. It is recommended, however, that there is no direct metallic coupling between the vibration sensor and other components of the electric motor, since, on the one hand, metals conduct vibrations very well, but, on the other hand, provide practically nonexistent damping in the case of strong vibrations. The at least one coupling element may be formed from a plastic which additionally improves or establishes an electric insulation of the sensor.

In a configuration, the at least one coupling element may include a casting compound which fills at least part of a gap between the electronics housing and the circuit board. When the electronics housing has a bottom and side walls, such gap can be formed, for example, between the bottom and the circuit board. Such casting compounds are widespread in motor electronics and are usually based on plastic. For example, they favor the dissipation of heat toward the electronics housing and stabilize the motor electronics in the electronics housing.

In a modification of this configuration a partition wall may be provided which divides the casting compound in a first casting compound and a second casting compound. It is useful in this case when said partition wall is also made from an electrically non-conductive material, e.g., a plastic. In this modification, the second casting compound has a lower elasticity than the first casting compound, i.e., the second casting compound is "harder" than the first casting compound. In addition, the second casting compound is arranged at the vibration sensor. This division into first and second casting compound has the advantage that in the area of the vibration sensor, a casting compound can be used which allows a favorable vibrational transmission to the vibration sensor, while in another area a casting compound can be used which for example, allows good heat dissipation.

In another embodiment, the at least one coupling element includes an adhesive pad or an adhesive that is inserted between the vibration sensor and part of the electronics housing. In this way, the vibration sensor can be coupled relatively firmly to other components of the electric motor, while still maintaining a simple installation when the circuit board is inserted into the electronics housing. The adhesive can be configured as a hardening adhesive, for example based on epoxy. In some embodiments, the adhesive pad and the adhesive have electrically insulating properties, i.e., the electrical conductivity is low.

In a further configuration the at least one coupling element includes a plastic overmold, which is attached on at least parts of the electric motor. In the case of electric motors, it is not uncommon that components of the electric motor are overmolded and connected to a plastic during an injection molding process. Thermoplastic or thermosetting materials are often used here. In this way, for example, parts of the wound lamination stack of the stator and parts of the electronics housing can be connected by overmolding. In this case, the bearing seat can be part of a package insulation or be part of the overmold. In such cases, said overmold can form a coupling element. A further coupling element, for example in the form of an adhesive pad, can be attached between the vibration sensor and the overmold. However, the plastic overmold may be in direct contact with the at least one vibration sensor.

In a further configuration, the at least one coupling element includes a (mechanical) fastener that mechanically and/or electrically connects the circuit board to another part of the electric motor. In this case, the fastener can be formed by a wide variety of structures that can generate a mechanical connection and a vibrational coupling. Detachable fastener can be used as well as non-detachable ones. Merely by way of example, but not limited, reference is made to the use of a screw, a rivet, a clamp, a pin, a dowel pin, a grooved nail, or the like. Depending on the fastener used, the type of coupling is done differently. In this case, the fastener, for example a configuration as a screw, can pass through a bore in the circuit board and be screwed into a thread in the electronics housing. For further improvement of a vibrational coupling between the vibration sensor and other components of the electric motor, it is useful if the fastener is arranged near the vibration sensor. This means that, when looking at the circuit board, the distance between fastener and the vibration sensor compared to the dimensions of the circuit board is significantly lower. In some embodiments, the distance is at most 20% of the dimensions of the circuit board, e.g., at most 10% of the dimensions. At the same time, it is recommended not to fall below a certain minimum distance between fasteners and vibration sensor. The distance may be at least 5% of the dimensions of the circuit board.

The above-mentioned configurations of the at least one coupling element can be combined relatively arbitrary. Some examples in which individual ones of the aforementioned coupling elements are combined with one another, are explained in more detail in the following exemplary embodiments. A person skilled in the art will recognize that and how the various configurations of coupling elements can also be combined in other ways.

In a further development, the electronics housing can be completely or partially coated with a plastic, or a plastic lining can be placed in the electronics housing. Such a development can be used, for example, to improve the insulation between the motor electronics and the electronics housing. In the case of an electronics housing that has a bottom and side walls, the bottom and/or the side walls can, for example, be coated or covered with the plastic. It would also be conceivable that only parts of the bottom or parts of the side walls are coated with plastic, or covered with a plastic lining.

In principle, the electric motor can be configured in various ways. It is only important that there is motor electronics on which the vibration sensor can be attached. In an example configuration, however, the electric motor is formed by an EC motor (Electronically Commutated Motor) in which the motor electronics generates a system of supply signals, the system of supply signals being able to generate a rotating field in the electric motor that causes the rotor to rotate. Here, the EC motor may be constructed in an internal or external rotor configuration.

The method may evaluate a vibration state of an electric motor. In an example method, in a first step, a measurement signal is generated using at least one vibration sensor, the measurement signal representing a speed and/or an acceleration of vibrations of the electric motor in at least one direction. In this case, the measurement signal includes a time course and frequency components in a frequency spectrum.

This measurement signal is analyzed in a further step in that an amplitude and/or a phase and/or a frequency of the measurement signal is determined for determining at least one parameter of the vibrations of the electric motor. The amplitude of the measurement signal refers to the extent to which the measurement signal moves. In the simplest case, the amplitude is the maximum amount that the measurement signal assumes in the measurement period under consideration. However, it would also be conceivable to consider the amplitude as the value that the measurement signal assumes on average in the measurement period under consideration. The frequency of the measurement signal refers to the spectral components of the measurement signal. Here, the "frequency of the measurement signal" can refer to a single dedicated frequency, several dedicated frequencies or one or more frequency ranges. The phase of the measurement signal refers to the temporal relationships between several sub-areas of the measurement signal. Here, the phase can, for example, relate to a relationship between active and reactive components of the measurement signal. When measuring vibrations in several directions, the phase, however, may refer to the temporal relationship between the measurement signals in the individual directions. From the amplitude, the phase and/or the frequency of the measurement signal it can be deduced how strongly and in what forms the electric motor vibrates. Thus, in this manner at least one parameter of the vibrations of the electric motor can be determined.

In a next step, the at least one parameter determined in this way is compared with a corresponding reference parameter. This means, for example, that the amplitude of the measured quantity is compared with a reference amplitude, for example, a maximum permissible amplitude. It is also possible here for several parameters to be compared with several respectively corresponding reference parameters. By combining several parameters, a more comprehensive picture of the vibration state of the electric motor can be determined than would be possible with a single parameter.

From the result of the comparison of the determined at least one parameter with the corresponding reference parameter or the corresponding reference parameters, in a further step, the vibration state of the electric motor is determined. Knowledge of the vibration behavior of the electric motor (for example from calibration measurements) or knowledge of a structural identical or very similar electric motor can be used here.

In a further development of the method, based on the determined vibration state, a warning message is generated and/or measure are initiated to protect the electric motor. In principle, a wide variety of reactions are conceivable that address the particular vibration state. A warning message can indicate that a maximum permissible vibration value has been reached or exceeded. A warning message can also signal, however, that there is an unfavorable vibration mode that places a heavy load on the electric motor. How the warning message is output, depends on the respective application scenario. It would be conceivable, especially in Industry 4.0 environments, for a corresponding warning message to be sent over a network. This warning message can be received, for example, by maintenance personnel or operating personnel and appropriate countermeasures can be taken. A warning message can also be output by a simple light-emitting diode, for example, green in normal operation and red in an unfavorable vibration mode. It would also be conceivable here for the light-emitting diode to light up orange, for example, when a first vibration limit value of the light-emitting diode is exceeded. A warning message can also be used—especially in the case of environments with adherent soiling—to trigger cleaning and/or maintenance work.

Alternatively or additionally, measures to protect the electric motor can be initiated based on the determined vibration mode. These measures can include, for example, changing the rotational speed of the electric motor. In most cases, reducing the rotational speed could help reduce the vibrations. In this way, the electric motor can be put in a less vibrating operational state. Another measure could include that the control is switched to a quieter mode of operation by compensating, for example, ripple in the driving torque more strongly.

In one configuration, prior to a comparison of the at least one parameter with a (respectively) corresponding reference parameter, it can be checked whether the at least one parameter exceeds a predefined limit value. For example, a threshold value can be defined which the amplitude of the measurement signal must exceed at least before further steps are carried out. If this threshold value is not reached by the measurement signal, the step of comparing and determining a vibration state can be skipped—to conserve computing resources.

Some functions and developments are summarized below, which can be carried out with the electric motor, the fan, and the method as disclosed herein:

1) Collection of vibration values of a motor electronics for the protection of electronic components, e.g., by adjusting the rotational speed/switching off at predetermined values. Because the sensor is attached directly to the electronics, the vibrations impinging on the motor electronics can be measured directly and possible damage to the electronics may be estimated. This could also be implemented with a separate (external) power or control electronics/frequency converter.
2) Collection of vibration values of an overall system by coupling of the motor, fan, or the electronics with customer-side components (such as, e.g., heat exchangers, ventilation ducts, heat pump, air handling housing, etc.). Possibility of fading out resonances of the overall system by setting a rotational speed at which the vibrations are reduced and that is slightly different from the target rotational speed.

3) Detection of damage in transit by comparing vibration values of the fan at the client during start-up with a stored reference curve of the final test (before delivery) of the fan. Outputting a warning message in case of exceeding limit values.

4) After start-up, determination of a slow increase in the imbalance due to soiling or corrosion (over long periods of time, e.g. weeks or months). Possibility of outputting a warning message or indication regarding a required cleaning of the fan and determination of cleaning or maintenance intervals.

5) Calculation/estimation of the state of wear of the bearing seats in the stator bushing based on the amplitude and/or frequency of the vibrations, vibration modes, the rotational speed, installation position, rotating masses and/or the running time (load profile).

6) Identification of a stall of the fan with possible output of a warning message or possible rotational speed adjustment in order to exit the critical operating state. An operation of the fan in the area of the stall normally leads to increased noise development, a pulsating air flow in the vicinity of the fan and to higher vibration levels than in normal operation. When a fan is operated in the stall zone, the blades begin to vibrate at their natural frequency. If this condition lasts for a longer period of time, the blades may break through fatigue.

7) Identification of resonances and/or the associated vibrations modes of the entire system. In coordination with the placement and alignment of the sensor, specific vibration modes can be identified with the aid of the amplitude and phase information of the sensor signal. This means that modal analysis while in operation is possible, which allows to link rotational speeds/load states of the motor with critical vibration events. Operation in or near these states has a negative impact on the service life of the application. Output of warning messages or active measures such as, e.g., active fading out individual critical rotational speed ranges can follow.

8) Collection of vibration values of a customer environment by coupling the motor/fan or the electronics with customer-side components (such as, e.g., heat exchangers, ventilation ducts, heat pump, air handling housing, etc.) when the motor/fan is at a standstill. When the motor is at a standstill, interfering vibrations that affect the motor/fan from the customer environment, can be collected and stored. This measurement can be done with the motor at standstill at certain time intervals and can be used to assess an installation situation, or for damage diagnosis. At very high vibration values a warning message can be output even before start-up of the fan.

There are now various possibilities for configuring and developing the teachings disclosed herein in an advantageous manner. For this purpose, on the one hand, reference is made to the claims depending on the independent claims and, on the other hand, to the following explanation of exemplary embodiments with reference to the drawings. In connection with the explanation of the exemplary embodiments with reference to the drawings, generally preferred configurations and further developments of the teaching are also explained. In the drawings:

All of the exemplary embodiments of electric motors illustrated in the figures are each constructed in an external rotor configuration. This means that the stator is arranged at the motor axis and the rotor is arranged around the stator. For the sake of clarity, the rotor of the electric motor is not illustrated in each of the figures. This does not mean—of course—that the electric motor does not have a rotor.

FIGS. 1 to 6 in each case illustrate a section through a stator 2 of an electric motor 1. A bearing tube 4 is formed at a motor axis 3, at the longitudinal ends of which a bearing receiving area 5 is formed in each case. The bearing receiving areas 5 are accommodating bearings not illustrated, to which a shaft of the electric motor, not illustrated, is rotatably mounted. A stator bushing 6 is formed from an aluminum component, at the one end of which the bearing tube 4 is formed and at the other end of which an electronic housing 7 is formed for accommodating a motor electronics. The electronics housing 7 has a bottom 8 and side walls 9. The motor electronics generates supply signals and outputs them to the stator and/or rotor windings. For the sake of clarity, FIGS. 1 to 6 only show a circuit board 10 of the motor electronics. In the following, the side of the circuit board 10 facing the bottom 8 is referred to as the bottom side 11 and the side of the circuit board 10 facing away from the bottom 8 is referred to as the top side 12. The various exemplary embodiments of the electric motor illustrated in FIGS. 1 to 6 differ in the arrangement of the vibration sensor 13 on the circuit board 10 and the coupling elements used in each case.

Figure 1:
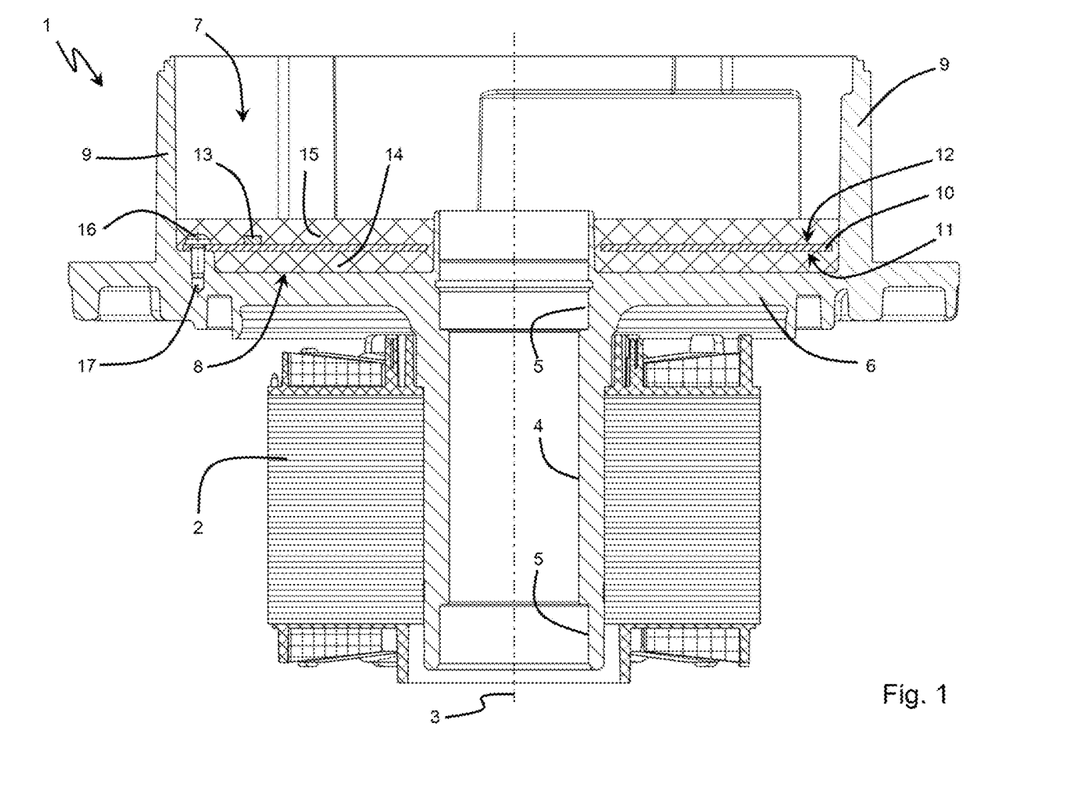
FIG. 1 shows a section through a first exemplary embodiment of an electric motor, a screw and a casting compound being used as coupling elements.

In the exemplary embodiment of FIG. 1, the vibration sensor 13 is arranged on the top side 12 of the circuit board 10. The circuit board 10 is embedded in a casting compound 14, 15, wherein the casting compound 14, 15 is connected at the edge area of circuit board 10. In this case, the part of the casting compound 14 enclosed between the bottom 8 and the bottom side 11 of circuit board 10 functions as a coupling element and transmits vibrations from the stator bushing 6 through the bottom 8 of the electronics housing 7 to the circuit board 10 and thus to the vibration sensor 13. A screw 16 is provided as a further coupling element, which is screwed into a bore 17 in the electronics housing 7. In the exemplary embodiment illustrated, the screw is arranged close to the vibration sensor 13 and thus ensures also that vibrations are transmitted from the stator bushing 6 to the circuit board 10 via the screw 16, and thus to the vibration sensor 13.

Figure 2:
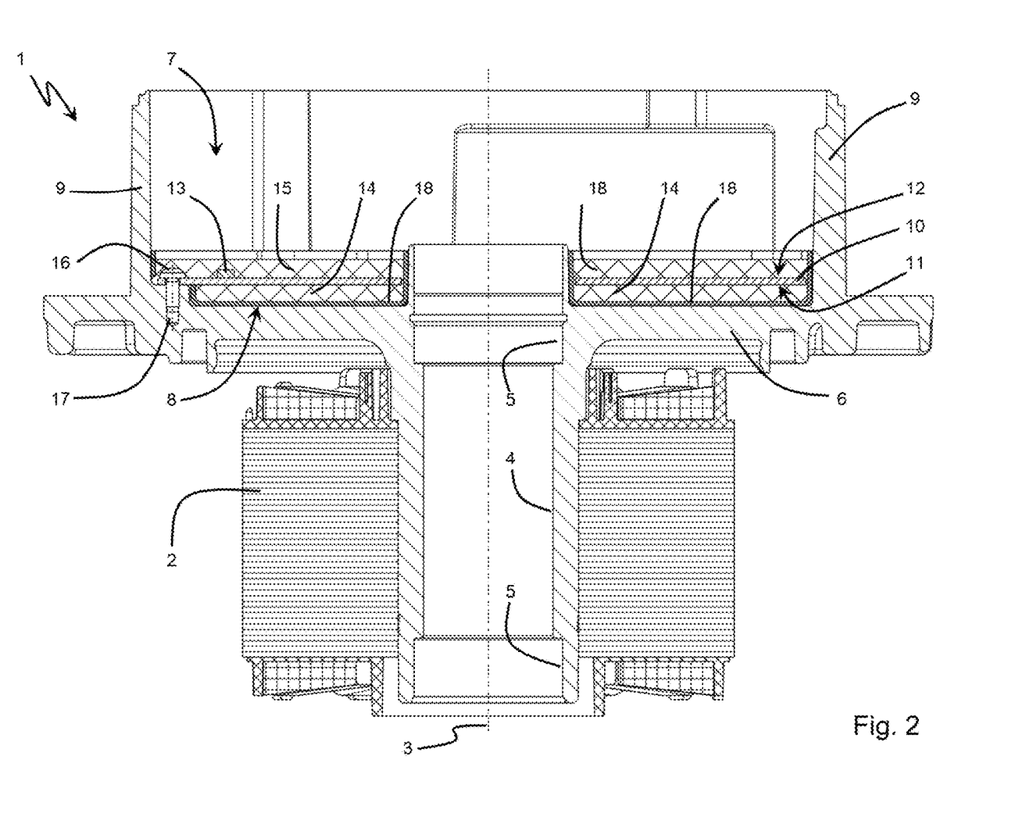
FIG. 2 shows a section through a second exemplary embodiment of an electric motor similar to the first exemplary embodiment, wherein additionally the bottom and the side walls of electronic housing are coated with a plastic.

The exemplary embodiment of FIG. 2 is very similar to the exemplary embodiment of FIG. 1. In addition, however, a plastic coating 18 is attached to the bottom 8 and to parts of the side wall 9 of the electronics housing. This plastic coating 18 provides additional electrical insulation, but also transmits vibrations of the electric motor, in this case, vibrations from the bottom 8 of the electronics housing 7 to the casting compound 14. Therefore, even this plastic coating 18 can form a coupling element.

Figure 3:
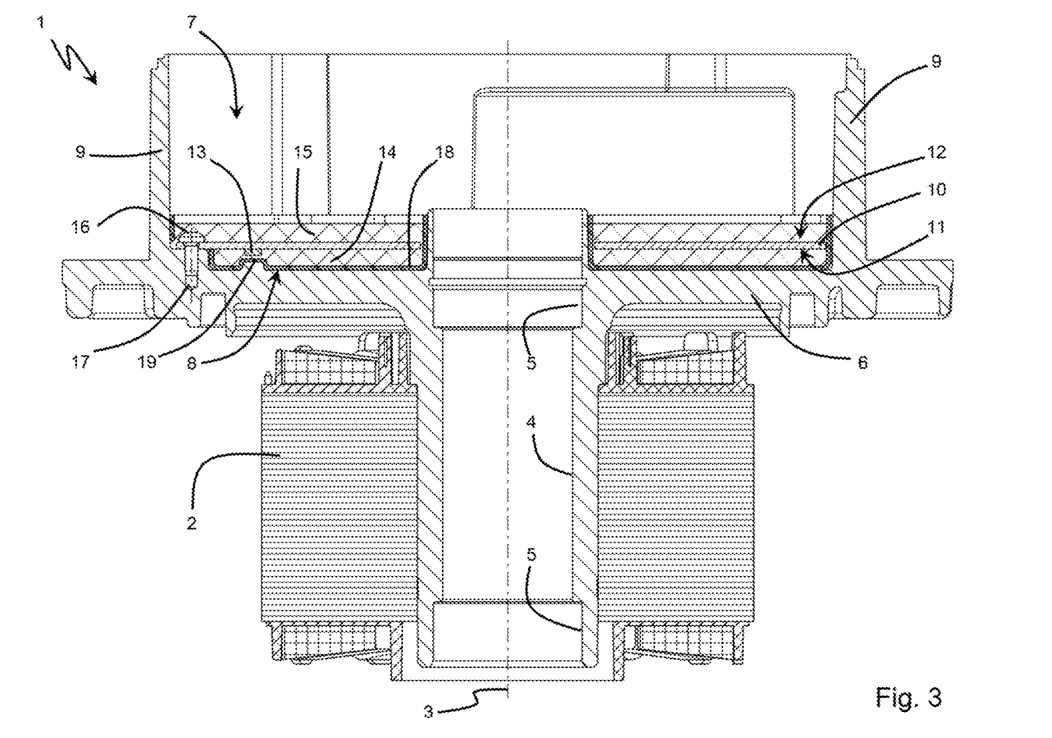
FIG. 3 shows a section through a third exemplary embodiment of an electric motor, wherein the bottom of the electronics housing has a protrusion in the area of the vibration sensor.

In the exemplary embodiment of FIG. 3, the vibration sensor 13 is arranged at the bottom side 11 of circuit board 10. In this exemplary embodiment, a casting compound 14, 15, a screw 16 and a plastic coating 18 are used as coupling elements. In order to reduce the distance between the bottom 8 of the electronics housing 7, a protrusion 19 is formed in the area of the vibration sensor 13. Said protrusion 19 is slightly wider than the extent of the vibration sensor 13 and is planar on the top side. Between protrusion 19 and vibration sensor 13 there is still some casting compound 14 and the plastic coating 18.

Figure 4:
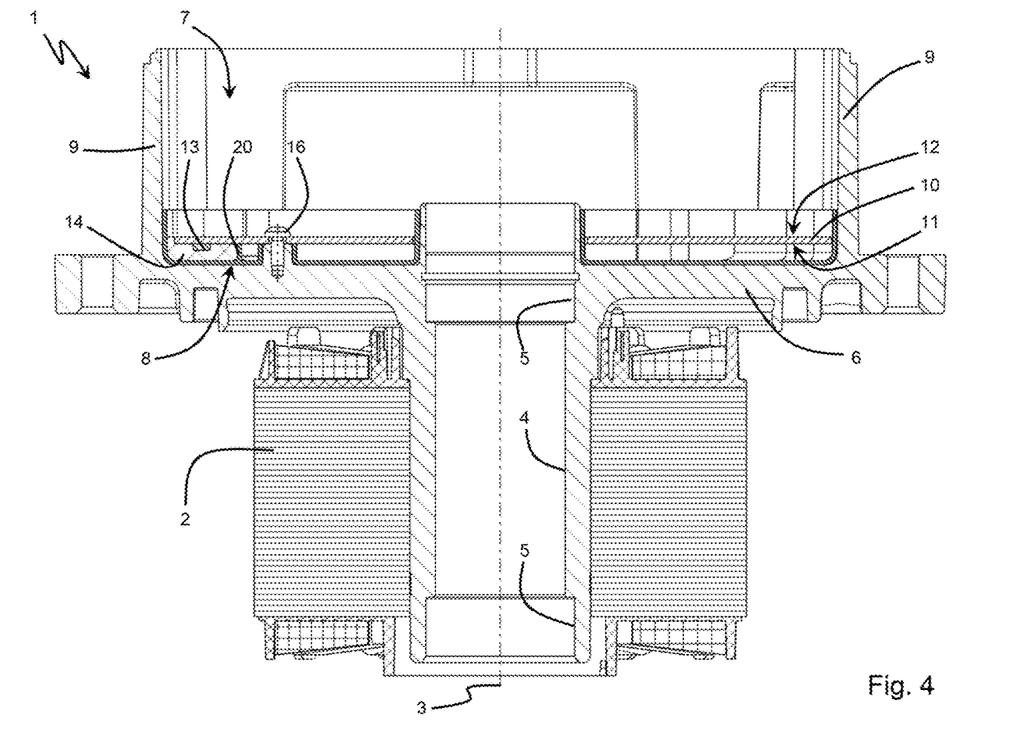
FIG. 4 shows a section through a fourth exemplary embodiment of an electric motor, wherein the bottom and parts of the side walls of the electronics housing are covered with a plastic and wherein only in a partial area between the bottom of the electronics housing and the circuit board a casting compound is used as a coupling element.

A partition wall 20 is formed in the embodiment of FIG. 4, which, in the exemplary embodiment illustrated, is formed integrally with a plastic lining 28. The plastic lining 28 covers—similar to the plastic coating 18 in FIG. 2 or 3—the bottom 8 and parts of the side wall 9. The partition wall 20 separates an area in which a casting compound 14 is arranged as a coupling element. The other areas between circuit board 10 and bottom 8 and the area above the circuit board 10 are not filled with casting compound. As a further coupling element there is again a screw 16 which is arranged close to the vibration sensor 13. In this exemplary embodiment, the screw 16 is placed between the motor axis 3 and the vibration sensor 13.

Figure 5:
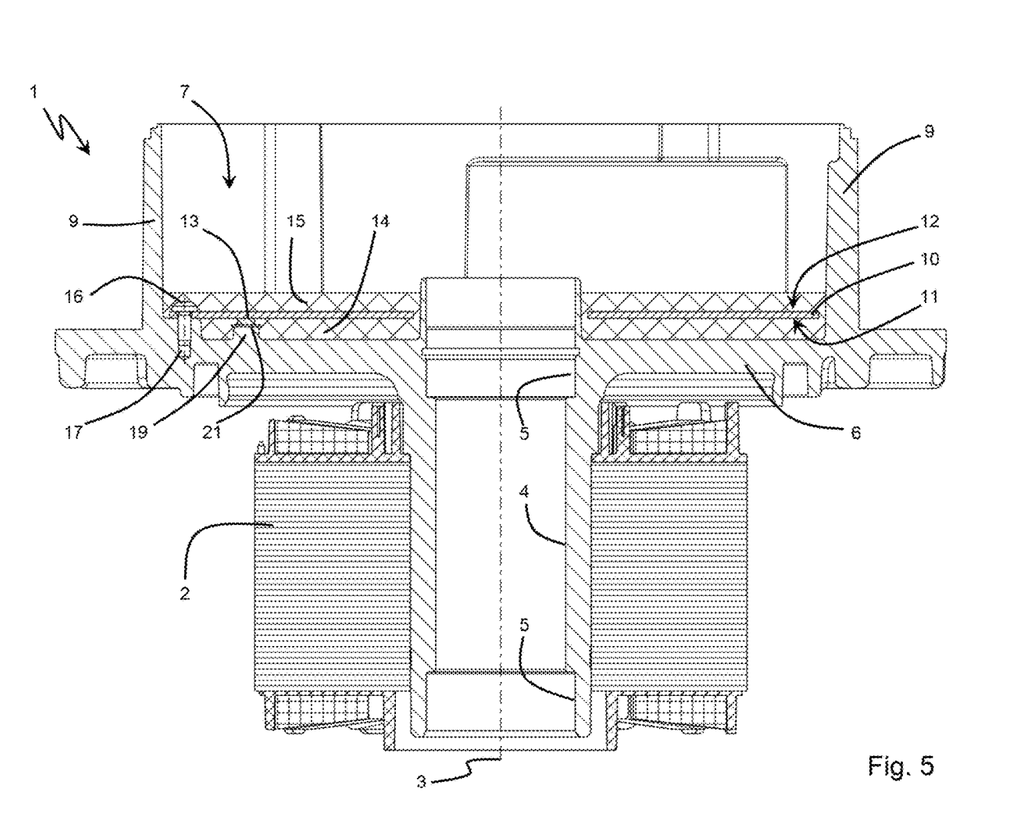
FIG. 5 shows a section through a fifth exemplary embodiment of an electric motor, a screw, a casting compound and an adhesive pad being used as coupling elements.
Figure 6:
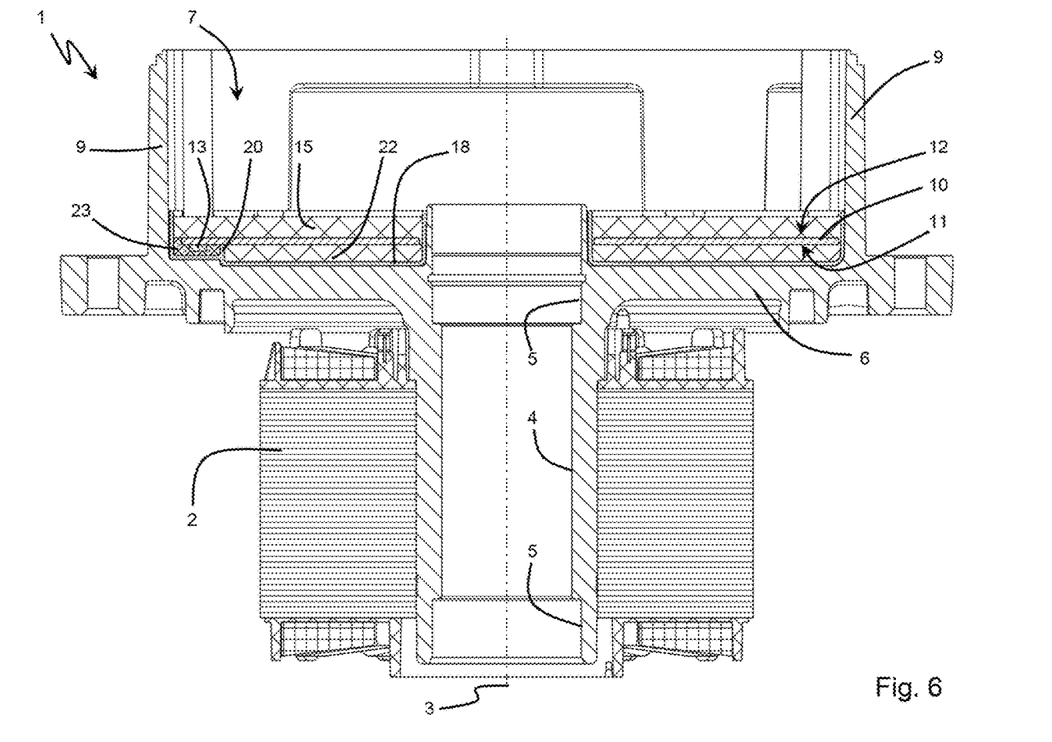
FIG. 6 shows a section through a sixth exemplary embodiment of an electric motor, wherein a casting compound is divided into a first and a second casting compound by a partition wall.

The exemplary embodiment of FIG. 5 includes, as coupling elements, a casting compound 14, 15 and a screw 16. Moreover, a protrusion 19 is formed at the bottom 8, which protrusion reduces the distance between the bottom 8 and the vibration sensor 13. In addition, an adhesive pad 21 is arranged as a further coupling element, which fills the area between the vibration sensor 13 and protrusion 19 and establishes a further vibrational coupling between the vibration sensor 13, the circuit board 10 and other components of the electric motor.

In FIG. 6, again, a partition wall 20 is provided, which in this case divides the casting compound between the bottom 8 and the circuit board 10, in a first casting compound 22 and a second casting compound 23. In this case, the second casting compound 23 has a lower elasticity than the first casting compound 22, so that the second casting compound 23 is "harder" than the first casting compound 22. In this way, the second casting compound 23 will establish a better coupling between vibration sensor 13 and other components of the electric motor, which is expressed by better transmission of higher frequencies.

Figure 7:
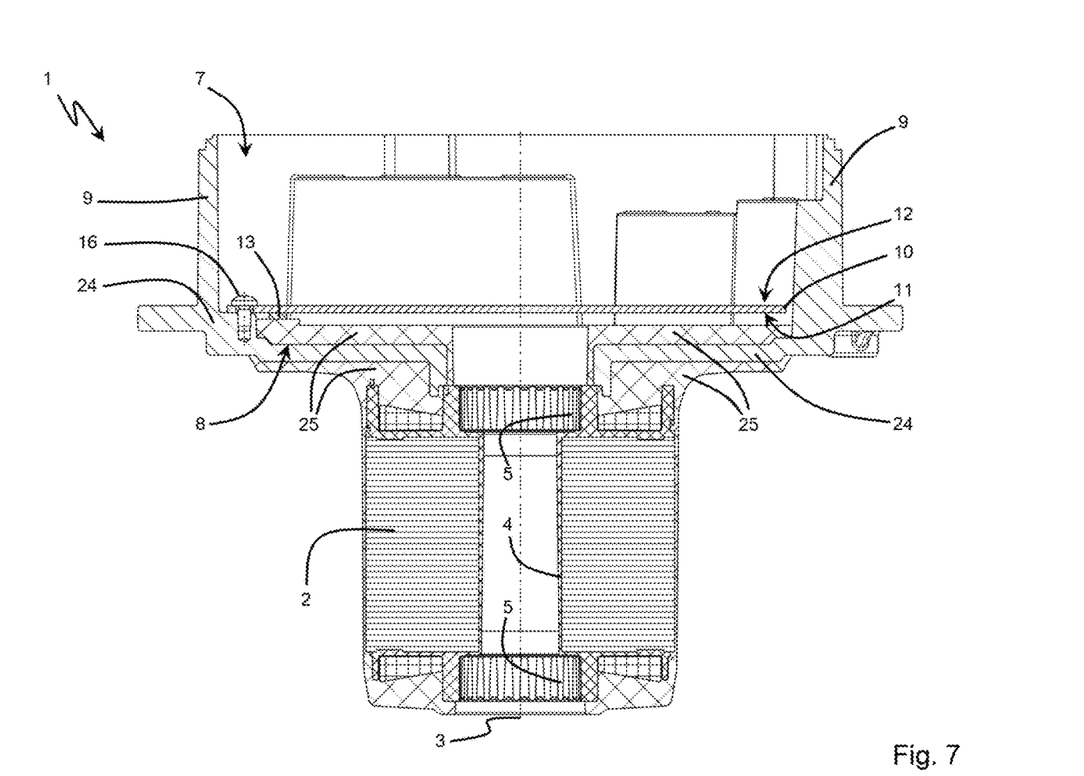
FIG. 7 shows a section through a seventh exemplary embodiment of an electric motor, a screw and a plastic overmold being used as coupling elements.

FIG. 7 illustrates another exemplary embodiment of an electric motor. In this case, the electronics housing 7 is formed by an aluminum component 24 having a bottom 8 and side walls 9. In the bottom 8, holes (not illustrated) are formed through which a plastic overmold 25 can penetrate during an injection molding process. Said plastic overmold connects the stator 2 to the electronics housing 7 and is configured as a BMC (Bulk Molded Compound). The plastic overmold is in direct contact with the vibration sensor 13 and serves as a coupling element. In addition, there is a screw 16 as a further coupling element, which is screwed into a thread in the aluminum component 25.

Figure 8:
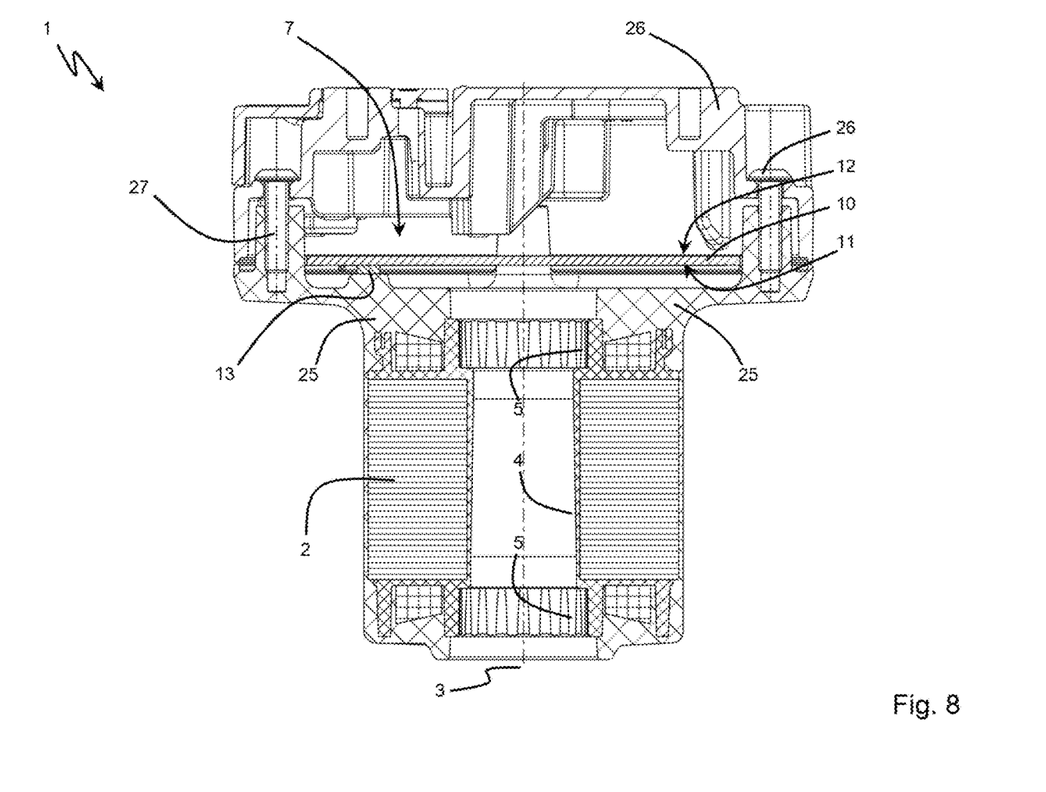
FIG. 8 shows a section through an eighth exemplary embodiment of an electric motor, a plastic overmold being used as the coupling element.

A relatively similar configuration is shown in FIG. 8, in which case the electronics housing 7 has no aluminum component but the electronics housing 7 is formed by the plastic overmold 25 itself. Here, too, the plastic overmold 25 forms a coupling element, and the vibration sensor 13 is in direct contact with the plastic overmold. In addition, a cover 26 is illustrated closing an open side of the electronics housing. This cover 26 is connected to the plastic overmold by screws 27.

Figure 9:
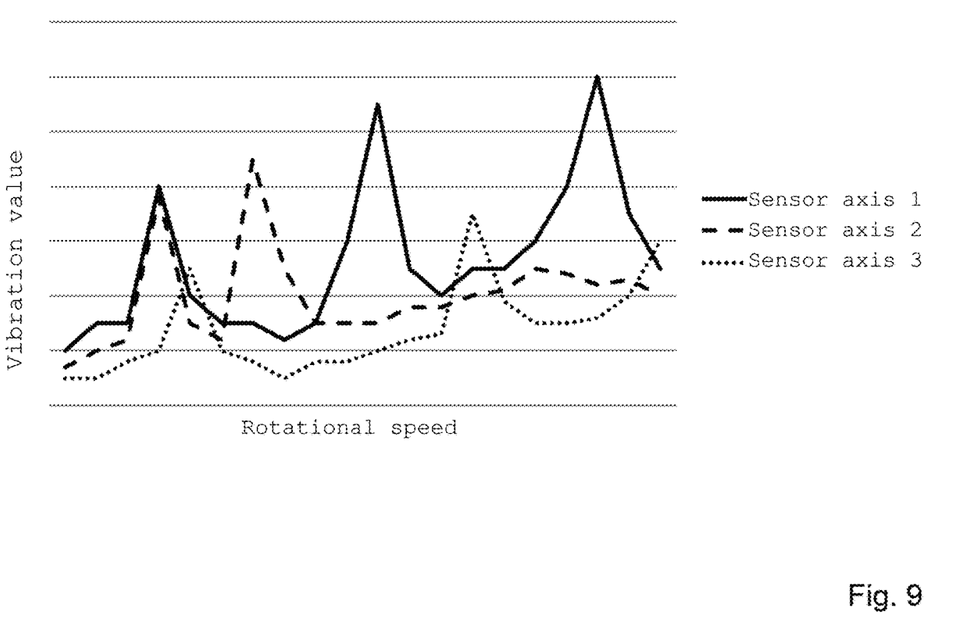
FIG. 9 shows a diagram with exemplary profiles of a vibration value at different rotational speeds and during measurement of the vibration sensors in different directions.

FIG. 9 shows a diagram with different signal profiles as they can arise on a vibration sensor of an electric motor. Such vibration sensor can, for example, be a vibration sensor 13 in an electric motor of the previously described exemplary embodiments. In this case, the three signal profiles illustrated represent exemplary measurement signals of a vibration sensor in three different directions. In this case, the three directions are respectively formed perpendicularly to each other. The solid line represents a measurement signal in a first sensor axis, the dashed line represents a measurement signal in a second sensor axis and the dotted line represents a measurement signal in a third sensor axis. The rotational speed is shown on the abscissa, and an amplitude of the measured value is shown on the ordinate. It can be seen that at different rotational speeds different signal profiles are formed in different sensor axes. These differences in different directions can be implemented in conjunction with a method, for example for one that is illustrated in FIG. 10.

Figure 10:
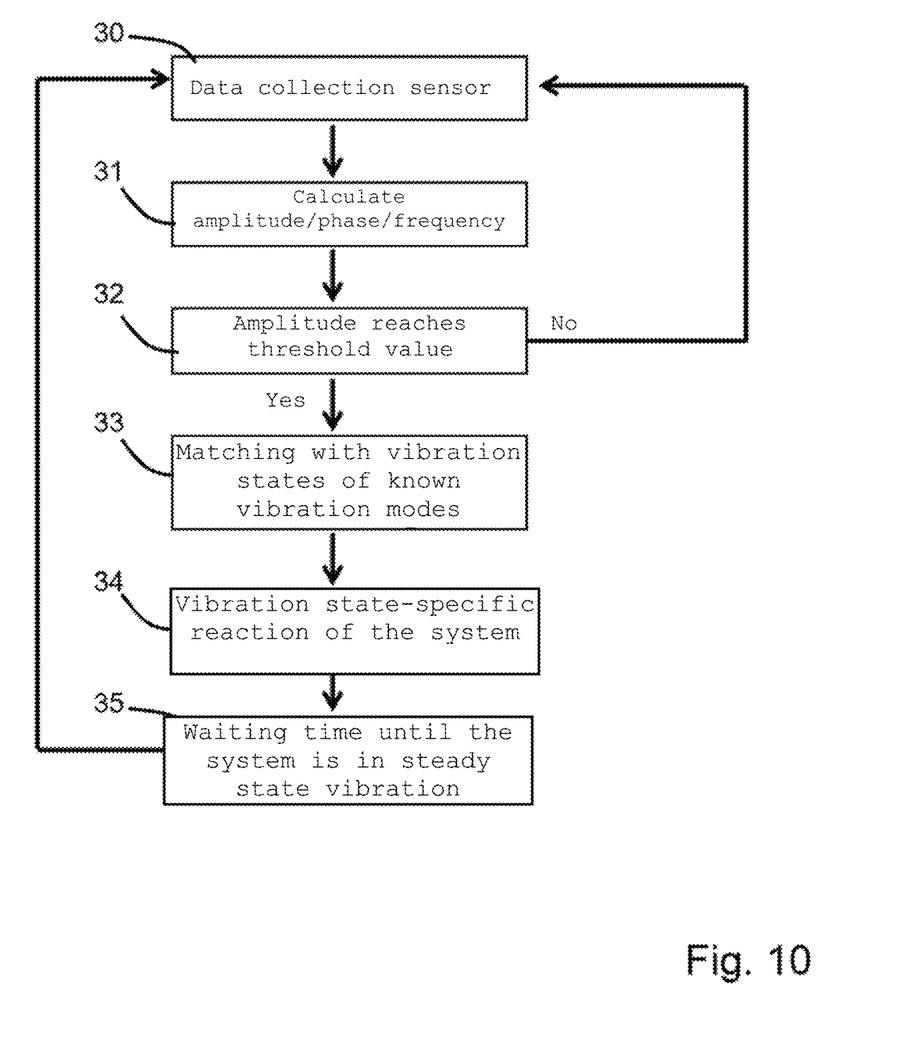
FIG. 10 shows a flow diagram of an exemplary embodiment of a method.

FIG. 10 illustrates a flow diagram of an exemplary embodiment of a method according to some embodiments. In a first step 30, measured values of the sensors are collected in at least one direction. In this exemplary embodiment, measured values are collected in three directions/sensor axes. In step 31, these measured values are analyzed, and the amplitude, phase and frequency of the measurement signal are calculated. This results in parameters of the vibrations of the electric motor. In step 32, the calculated amplitude is compared to a reference amplitude. Provided that the amplitude of the measurement signals does not exceed a threshold value in all sensor axes, further processing is aborted and returned to a new data collection in step 30. If the amplitude of a measurement signal in a sensor axis exceeds the threshold value, the further steps are carried out.

In step 33, the determined measurement values and/or the calculated parameters are matched with vibrational states of known vibration modes, i.e., said determined parameters are compared with reference parameters, said reference parameters in each case having been recorded at known vibration modes. These reference parameters can come from a database, the content of which was created in a calibration measurement of the electric motor. Alternatively, the database can also contain reference parameters of a structurally identical or at least similar electric motor. From this it can be concluded which vibration state the electric motor is currently in.

In step 34, responsive to the identified vibration state, for example, the rotational speed is slightly reduced. In step 35 one waits until the changes have taken effect and the system has moved to a steady state. This usually happens within a few seconds to a few minutes. The method is then repeated at step 30 and a new data collection is carried out.

With regard to further advantageous configurations of the electric motor or of the method, to avoid repetitions, reference is made to the general part of the description and to the accompanying claims.

Finally, it should be explicitly noted that the above-described exemplary embodiments only serve to explain the claimed teaching, but do not limit it to the exemplary embodiments disclosed.

LIST OF REFERENCE NUMERALS 1 electric motor (rotor not shown)
2 stator
3 motor axis
4 bearing tube
5 bearing receiving area
6 stator bushing
7 electronics housing
8 bottom
9 side wall
10 circuit board
11 bottom side
12 top side
13 vibration sensor
14 casting compound
15 casting compound
16 screw
17 bore
18 plastic coating
19 protrusion
20 partition wall
21 adhesive pad
22 first casting compound
23 second casting compound
24 aluminum component
25 plastic overmold
26 cover
27 fastening screws
28 plastic lining

The invention claimed is:

1. An electric motor comprising:
a stator;
a rotor rotatably mounted relative to the stator;
motor electronics located in a housing and mounted on a motor electronics circuit board; and
at least one vibration sensor disposed on the motor electronics circuit board, the at least one vibration sensor configured to measure at least one of an acceleration and speed of vibrations of the electric motor in at least one direction, wherein the motor electronics circuit board is vibrationally coupled to other components of the electric motor via at least one coupling element such that vibrations of the electric motor are transmitted to the at least one vibration sensor.

2. The electric motor of claim 1, wherein the housing comprises a bottom and sidewalls.

3. The electric motor of claim 2, wherein the at least one vibration sensor is disposed on a side of the motor electronics circuit board facing the bottom of the housing.

4. The electric motor of claim 2, wherein the bottom of the housing comprises a protrusion adjacent to the at least one vibration sensor so that a distance between the at least one vibration sensor and the housing is reduced proximate to the protrusion.

5. The electric motor of claim 1, wherein the at least one coupling element is made from plastic.

6. The electric motor of claim 1, wherein the at least one coupling element comprises a casting compound filling at least part of a region between the housing and the motor electronics circuit board.

7. The electric motor of claim 6, wherein the casting compound is divided into a first casting compound and a second casting compound by a partition wall, the second casting compound having a lower elasticity than the first casting compound and the second casting compound disposed adjacent to the at least one vibration sensor.

8. The electric motor of claim 1, wherein the at least one coupling element comprises an adhesive pad or an adhesive.

9. The electric motor of claim 1, wherein the at least one coupling element comprises a plastic overmold attached to the electric motor, wherein the at least one vibration sensor is in direct contact with the plastic overmold.

10. The electric motor of claim 1, wherein the at least one coupling element comprises a fastener, the fastener selected from the group consisting of a screw, a rivet, a clamp, a dowel pin and a grooved nail, wherein the fastener is disposed proximate to the at least one vibration sensor.

11. The electric motor of claim 1, wherein the housing is integral with a stator bushing of the electric motor.

12. The electric motor of claim 1, wherein the electric motor comprises an electronically commutated motor.

13. The electric motor of claim 1, wherein the housing comprises a bottom and sidewalls and at least one of the bottom and the sidewalls are coated with plastic.

14. A fan comprising:
an impeller; and
the electric motor of claim 1, wherein the impeller is connected to the rotor.

15. A method for evaluating a vibration state of the electric motor of claim 1, the method comprising:
generating a measurement signal using the at least one vibration sensor, wherein the at least one vibration sensor is configured for measuring at least one of an acceleration and speed of vibrations of the electric motor in at least one direction;
determining at least one of an amplitude, a phase, and a frequency of the measurement signal to determine at least one vibration parameter representing the vibrations of the electric motor;
comparing the at least one vibration parameter with a corresponding reference parameter; and
determining a vibration state of the electric motor based on the comparison of the at least one vibration parameter with the corresponding reference parameter.

16. The method of claim 15, wherein based on the determined state of vibration, further comprising at least one of:
generating a warning message; and
initiating measures to protect the electric motor.

17. The method of claim 15, wherein prior to comparing the at least one vibration parameter with the corresponding reference parameter, evaluating whether the at least one vibration parameter exceeds a predefined limit value.

* * * * *